MAGNETIC RECORDER

Filed Aug. 31, 1961 2 Sheets-Sheet 1

INVENTOR.
FRANK A. RAMRATH
JOSEPH V. COMISKEY
BY
Philip J McFarland
ATTORNEY

INVENTOR.
FRANK A. RAMRATH
JOSEPH V. COMISKEY
BY
Philip J. McFarland
ATTORNEY

United States Patent Office 3,153,241
Patented Oct. 13, 1964

3,153,241
MAGNETIC RECORDER

Frank A. Ramrath, South Weymouth, Mass., and Joseph V. Comiskey, North Providence, R.I., assignors to Laboratory for Electronics, Inc., Boston, Mass., a corporation of Delaware Filed Aug. 31, 1961, Ser. No. 135,224
2 Claims. (Cl. 346—74)

This invention relates generally to data processing apparatus and particularly to magnetic recording devices for recording and retrieving information which use a flexible recording medium.

It has been known for some years that so-called "non-contacting" magnetic recorders (wherein there is no physical contact between a magnetic transducer and its associated recording medium) must be used if certain types of information, as high frequency or wide-band signals, are to be processed satisfactorily. Among the known "non-contacting" magnetic recorders are those which utilize a "pliant" recording medium.

In known types of pliant disc recorders, a flexible recording disc is rotated in a fluid, as air, adjacent to a stabilizing plate in which one or more magnetic transducers are embedded. As the disc is rotated, a combination of fluid, elastic and dynamic forces is set up in and on the disc. When these forces are in equilibrium, the disc assumes the shape of a surface of revolution adjacent to and spaced from the stabilizing plate. If one properly selects the parameters of the system, as the flexibility of the disc, fluid pressure and rotational speed, one finds that the equilibrium condition occurs when the spacing between the recording disc and the stabilizing plate is such that the desired recording may be accomplished.

Experience has proven, however, that several practical difficulties must be overcome for satisfactory operation of the type of disc recorder just mentioned. For example, it is important that the stabilizing plate-magnetic transducer combination not introduce any unwanted discontinuities which affect the flow of fluid. Therefore, it is customary to lap the surface of the assembly until its surface roughness is within about 20 microinches. Obviously such an operation is, at best, extremely difficult and expensive in view of the differences in the materials which must be burnished or lapped.

It has also been observed that, unless special precautions are taken to control the fluid pressure gradients over the surface of a pliant recording disc, appreciable amounts of power are required. The reason for this is that, if the spacing between the disc and the transducers is made small for best recording, frictional effects in the fluid become large. Obviously, power requirements are critical in many applications and should be minimized.

It has also been noted that if magnetic transducers are embedded in a stabilizing plate, the magnetizable surface of the recording medium which, perforce, is close to the stabilizing plate will occasionally rub against such plate during starting or stopping. As a result of such rubbing, the magnetizable surface may be rendered unusable. Further, if the relative positions of the magnetic transducers in the stabilizing plate must be set during assembly, no change is possible during operation. Such a limitation is undesirable because change in the relative positions of the magnetic transducers is often required, as when the recorder is to be used as an element in a recirculating register.

Therefore, it is an object of the invention to provide a non-contacting flexible disc recorder in which the flexible recording medium may be independently stabilized and positioned with respect to each one of a plurality of magnetic transducers.

It is another object of the invention to provide a pliant disc magnetic recorder which is simple to make and requires no closely machined parts.

Still another object of the invention is to provide a pliant disc magnetic recorder which, in operation, will "fail-safe" in the event the operating fluid pressure is lost for any reason.

A still further object of the invention is to provide a pliant disc magnetic recorder in which the relative positions of a plurality of magnetic transducers may be varied within wide limits during operation.

These and other objects of the invention are obtained generally by providing in a non-contacting magnetic recorder a flexible recording medium in the shape of a disc; means for rotating such a disc adjacent to a stabilizing ring in a fluid, as air, to set up dynamic and fluid forces which, in combination with the inherent elastic forces in the disc, cause the disc to assume the shape of a surface of revolution spaced from the annular ring; a plurality of magnetic transducers; means for supporting each magnetic transducer near the side of the disc opposite to the annular ring at any desired point adjacent to such side; and means in each magnetic transducer to introduce a fluid, again as air, under pressure between each such magnetic transducers and the disc. Thus, the equilibrium condition of the forces on the rotating disc may be changed adjacent to each of the transducers when it is desired to record information on or read information out of the disc without affecting the main stabilizing forces acting on the disc.

For more complete understanding the invention reference is now made to the following detailed description of a preferred embodiment of the invention and to the accompanying drawings in which FIG. 1 is an isometric view, partially cut away and greatly simplified, of a magnetic recorder, incorporating the principals of the invention;

Figures 1, 2:
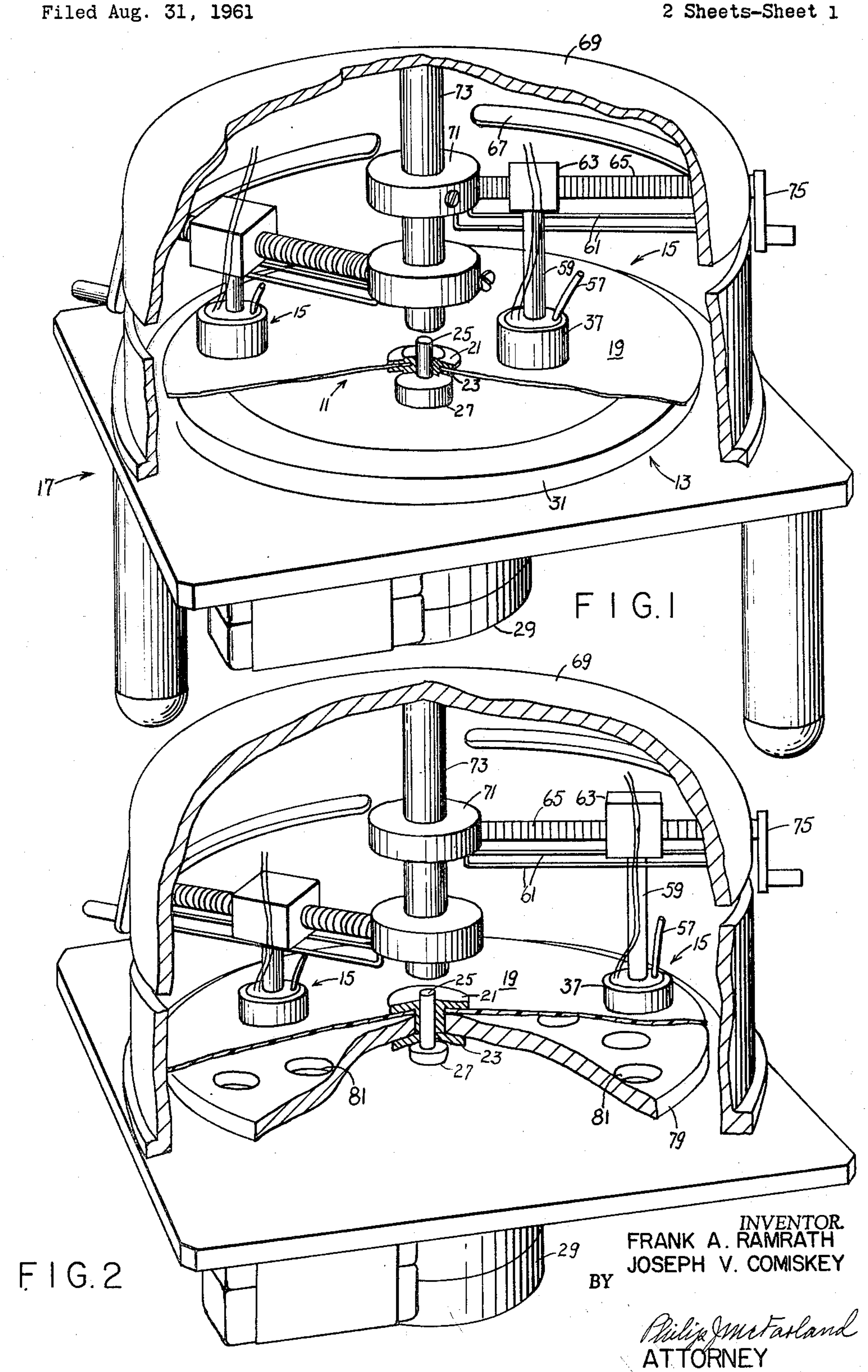
FIG. 2 is an isometric view, partially cut away, of an alternative form of the magnetic recorder shown in FIG. 1.

Referring now to FIG. 1 it may be seen that a preferred embodiment of the invention consist generally of a rotating disc assembly 11; a disc stabilizing assembly 13 and a plurality of magnetic transducer assemblies (each indicated by the numeral 15) supported on a base assembly 17.

The rotating disc assembly 11 consists of magnetic recording medium in the shape of a flexible disc 19 centrally supported on a shaft 25 between a pair of flanges 21, 23. The shaft 25 in turn is rotatably supported in a bearing 27 set in the base plate assembly 17 and is joined to the rotor shaft (not shown) of an electric motor 29. Thus, when the electric motor 29 is energized rotational movement of its rotor is transmitted through the shaft 25 to the flexible disc 19.

The disc stabilizing assembly 13 consists of an annular ring 31 attached in any known manner, as by cementing, to the base assembly 17 concentrically with the axis of the shaft 25. As flexible disc 19 is rotated, air is drawn through the space between the shaft 25 and the bearing 27 and is pumped outwardly, passing between the disc 19 and the top of the annular ring 31. Consequently the disc 19 is forced into the shape of a surface of revolution spaced in the order of 0.010 inch from the annular ring 31. It should be noted in passing, however, that the spacing between flexible disc 19 and the annular ring 31 may be varied within wide limits. It is required only that, whatever the spacing, there be a fluid pressure gradient radially of the flexible disc 19 to eliminate visual signs of flutter around the periphery of that element and to maintain a space between the flexible disc 19 and the annular ring 31.

The fact that the spacing between the flexible disc 19 and the annular ring 31 may be varied within wide limits without adversely affecting operation offers many advantages.

Among such advantages are the following: (*a*) different flexible recording discs may be interchanged without any necessity of readjusting air flow or rotational speed; (*b*) there is no need to burnish the annular ring 31 to minimize the discontinuities in the fluid path; and, (*c*) there is no need to control fluid pressures within close tolerances. This last advantage is particularly interesting to the designer of a recorder. Thus, the solid base plate illustrated may be changed in many ways. For example, the base plate could be perforated or could even be eliminated and replaced by a spider which would support the stabilizing ring approximately concentrically with the shaft 25.

Figure 3:
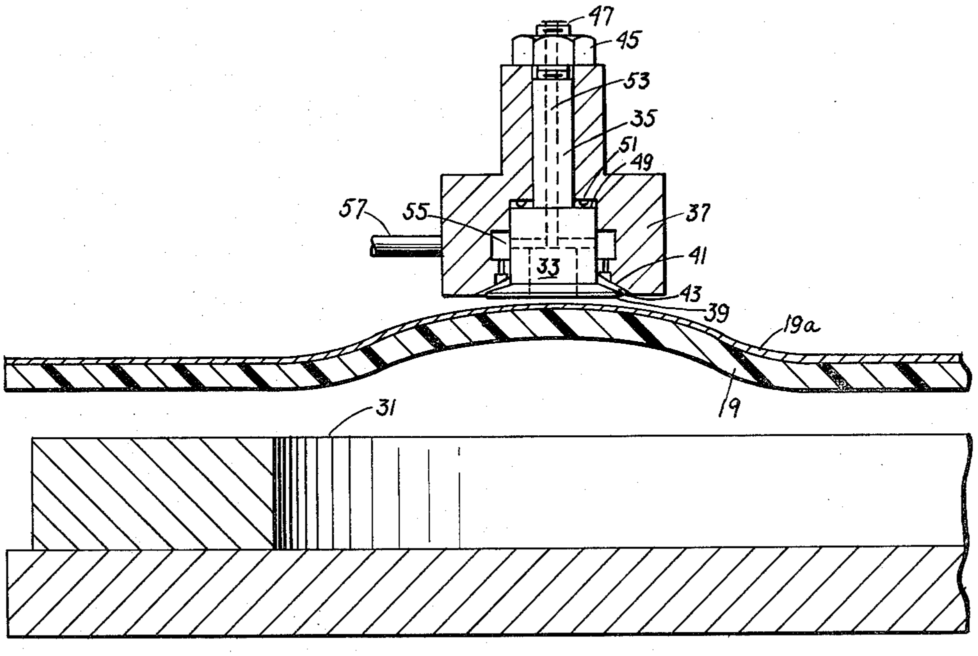
FIG. 3 is a partial cross section, greatly exaggerated for purposes of explanation, showing the disposition of the magnetic recording medium immediately adjacent to a magnetic transducer in either of the embodiments illustrated in FIG. 1 or 2.
Figure 4:
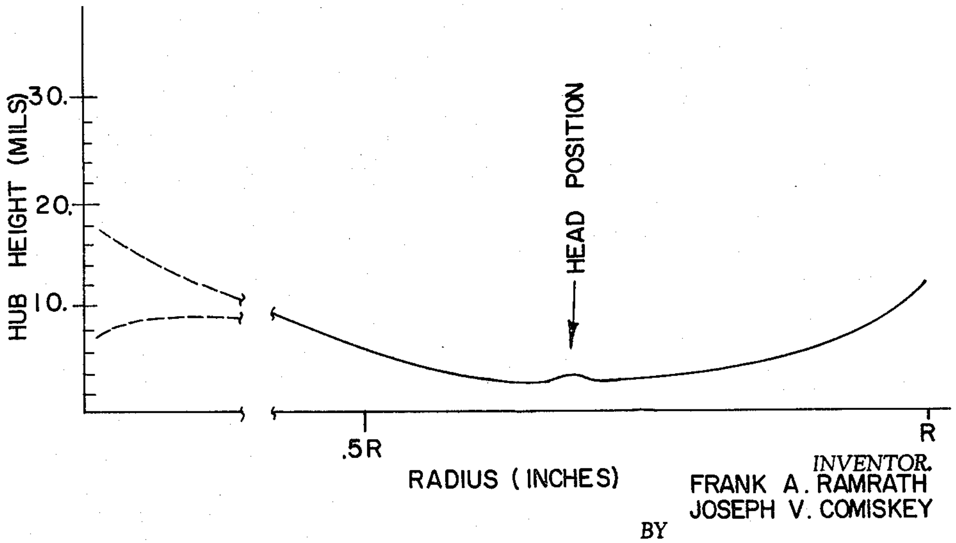
FIG. 4 is an idealized graph showing a typical cross-sectional shape of the magnetic recording medium.

Since the magnetic transducer assemblies shown in FIG. 1 and FIG. 2 may be identical, only one will now be described. Referring now to FIG. 3, the details of the lower part of one of the magnetic transducer assemblies may be clearly seen. A magnetic head 33 is pressed into or cemented in, a hole in a generally cylindrical core 35, which in turn is supported in a cylindrical body 37. The lower section 39 of the cylindrical core 35 is flared as indicated so that it may be recessed into a countersink 41 in the body 37 to form an annular nozzle 43. The core 35 is held in position in the body 37 by a nut 45 threaded on the upper end 47 of the cylindrical core 35 and tightened until a projecting surface 49 of the cylindrical core 35 is seated on projections 51 on the cylindrical body 37. An axial opening 53 through the cylindrical core 35 accommodates the lead wires (not shown in FIG. 3) of the magnetic head 33. An annular chamber 55 opening to the annular nozzle 43 and to an air line 57 completes the lower part of the transducer assembly. In operation, whenever air under pressure is introduced into the annular chamber 55 through the air line 57, a portion of such air passes through the annular nozzle 43 causing a localized lowering in the pressure between the bottom of the cylindrical body 37 and the flexible disc 19 from the magnetic head 33. It is also obvious that, unless air is at a higher pressure in the annular chamber 55 than outside, there is no airflow between the flexible disc 19 and the bottom of the cylindrical body 37 to cause movement of the flexible disc 19. In other words, the magnetizable surface **19*a* will not approach the magnetic head 33** in the event air pressure is lost for any reason.

The supporting structure for the magnetic transducer assembly is most clearly shown in FIG. 1 or FIG. 2. The cylindrical body 37 is supported by a post 59 which passes between a pair of rods 61 to a nut 63 on a leadscrew 65. The pair of rods 61 and the leadscrew 65 are supported radially of the flexible disc 19 by a slot 67 in a cover 69 and a bushing 71 fitted on a post 73 depending from the cover 69. A handwheel 75 is fitted on to the outer end of the leadscrew 65 to complete the assembly. It may be seen, then, that the magnetic transducer assembly may be positioned above the flexible disc 19 by moving the leadscrew 65 and rods 61 in the slot 67 and by rotating the handwheel 75.

The embodiment of the invention shown in FIG. 2 differs from the embodiment shown in FIG. 1 in that there is no annular ring to stabilize the flexible disc. Rather a stabilizing plate 79 having a plurality of apertures 81 is used. The stabilizing plate 79 is held on the shaft 25 between the flanges 21, 23 along with the flexible disc 19. Thus, when the shaft 25 is rotated, the stabilizing plate 79 rotates along with the flexible disc 19 and air is drawn through the apertures 81 to be pumped radially outwardly thus forcing the flexible disc 19 to assume a position adjacent to but spaced from the stabilizing plate 81.

It will be noted that in the embodiment shown in FIG. 2, there is never any change of rubbing between the flexible disc 19 and elements on either side of it. Consequently there is little if any chance that the flexible disc 19 may ever be damaged in operation. It should also be noted that the material and finish of the stabilizing plate 81 may be varied within wide limits. For example, either a plastic material, as Mylar, or a metal, as aluminum, may be used and no special finishing is needed.

While the invention has been explained with reference to particular preferred embodiments, many variations of the particular elements and subassemblies are possible without departing from the inventive concepts. It is necessary only that a flexible recording disc in a magnetic recorder be stabilized by means independent of the means used to adjust the spacing between a magnetizable surface of such a disc and each one of the individual magnetic transducers used in such a recorder. Thus, it follows that the particular shape of the nozzles used with each head, the particular pressures used and the manner in which each head is supported are not critical but may be changed within wide limits. For example, even a drilled hole may be used in place of the illustrated annular nozzle. Likewise, the spacing between each magnetic head and the magnetizable surface of the recording medium may be independently adjusted so that any head may be used either for recording or reading. Consequently a simple switching arrangement is all that is required to allow use of a single amplifier either to drive the head for recording or to amplify the output of the head for readout. It is felt, therefore, that the invention should not be restricted to the illustrated embodiments but rather should be limited only by the spirit and scope of the appended claims.

What is claimed is:

1. A magnetic recorder in which a flexible disc having a magnetizable surface is used as a magnetic storage medium comprising:
   (*a*) a stabilizing plate, spaced from the flexible disc, having a substantially flat surface;
   (*b*) means for rotating the flexible disc adjacent to the substantially flat surface of the stabilizing plate to cause the magnetizable surface of the flexible disc to assume the shape of a surface of revolution;
   (*c*) a magnetic transducer disposed adjacent the flexible disc on the side thereof opposite the stabilizing plate; and,
   (*d*) means operative through the magnetic transducer to deform the flexible disc locally adjacent such transducer and adjust the spacing between the gap thereof and the magnetizable surface of the flexible disc.

2. A magnetic recorder as in claim 1 wherein the stabilizing plate is perforate and rotatable with the flexible disc.

References Cited in the file of this patent

UNITED STATES PATENTS

| | | |
|---|---|---|
| 2,772,135 | Hollabaugh et al. | Nov. 27, 1956 |
| 2,950,353 | Fomenko | Aug. 23, 1960 |
| 3,001,850 | Marrs | Sept. 26, 1961 |
| 3,060,433 | Lee | Oct. 23, 1962 |

FOREIGN PATENTS

| | | |
|---|---|---|
| 763,815 | Great Britain | Dec. 19, 1956 |

OTHER REFERENCES

"Compound Air Head," Streeter, IBM Tech. Disclosure Bull., vol. 3, No. 8, January 1961, pages 4–5.